(12) United States Patent
Foster (10) Patent No.: US 10,710,625 B2
(45) Date of Patent: Jul. 14, 2020

(54) INSERTABLE WINDOW ASSEMBLY

(71) Applicant: Phyllis Foster, New Bedford, MA (US)

(72) Inventor: Phyllis Foster, New Bedford, MA (US)

( * ) Notice: Subject to any disclaimer, the term of this patent is extended or adjusted under 35 U.S.C. 154(b) by 67 days.

(21) Appl. No.: 16/115,014

(22) Filed: Aug. 28, 2018

(65) Prior Publication Data

US 2020/0070867 A1 Mar. 5, 2020

(51) Int. Cl.
*B62B 9/10* (2006.01)
*B62B 9/14* (2006.01)

(52) U.S. Cl.
CPC .................................. *B62B 9/142* (2013.01)

(58) Field of Classification Search
CPC ...................................................... B62B 9/142
See application file for complete search history.

(56) References Cited

U.S. PATENT DOCUMENTS

| | | | |
|---|---|---|---|
| 6,012,184 A * | 1/2000 | Childers | A47D 15/00 5/416 |
| D421,940 S | 3/2000 | Gibson | |
| 8,550,548 B2 | 10/2013 | Gibbons | |
| 9,079,521 B1 | 7/2015 | Bowe | |
| 2001/0013689 A1 * | 8/2001 | Cone, II | B62B 9/28 280/47.41 |
| 2003/0102689 A1 | 6/2003 | Cho | |
| 2004/0129306 A1 * | 7/2004 | Jefferson | A61G 5/10 135/96 |
| 2007/0210171 A1 * | 9/2007 | Spitz | A45C 3/04 235/486 |
| 2008/0203757 A1 * | 8/2008 | Gilberg | B62B 9/145 296/100.16 |
| 2012/0062001 A1 * | 3/2012 | Krasley | B62B 9/142 297/184.13 |
| 2013/0057032 A1 * | 3/2013 | Turnage | A47D 15/00 297/184.13 |
| 2015/0183352 A1 * | 7/2015 | Bowe | A47D 15/00 297/184.11 |

FOREIGN PATENT DOCUMENTS

| | | | | |
|---|---|---|---|---|
| CA | 2561849 A1 * | 8/2006 | | B62B 9/142 |
| GB | 2388821 A * | 11/2003 | | B62B 9/142 |
| JP | 3214195 U * | 12/2017 | | A01K 1/0236 |

* cited by examiner

*Primary Examiner* — Lori L Lyjak (57) ABSTRACT

An insertable window assembly for incorporating a window into a canopy on a baby carriage includes an infant transport that has a resting surface and a canopy at least partially covering the resting surface. The canopy has a top surface and a bottom surface, and a receiving aperture extending through the top surface and the bottom surface. The receiving aperture facilitates a caregiver to see the infant in the infant transport. A window is attached to the infant transport and the window is positioned on the canopy to cover the receiving aperture. A cover is attached to the window and the cover is removably positioned over the window. The cover is comprised of an opaque material to inhibit light from flowing through the window and into the infant transport.

14 Claims, 6 Drawing Sheets

INSERTABLE WINDOW ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to window devices and more particularly pertains to a new window device for incorporating a window into a canopy of a baby carriage.

BRIEF SUMMARY OF THE INVENTION

An embodiment of the disclosure meets the needs presented above by generally comprising an infant transport that has a resting surface and a canopy at least partially covering the resting surface. The canopy has a top surface and a bottom surface, and a receiving aperture extending through the top surface and the bottom surface. The receiving aperture facilitates a caregiver to see the infant in the infant transport. A window is attached to the infant transport and the window is positioned on the canopy to cover the receiving aperture. A cover is attached to the window and the cover is removably positioned over the window. The cover is comprised of an opaque material to inhibit light from flowing through the window and into the infant transport.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new window device embodying the principles and concepts of an embodiment of the disclosure and generally designated by the reference numeral 10 will be described.

As best illustrated in FIGS. 1 through 5, the insertable window assembly 10 generally comprises an infant transport 12 that has a resting surface 14 and a canopy 16 at least partially covering the resting surface 14. The infant transport 12 may be a baby carriage or the like for transporting an infant. The canopy 16 has a top surface 18 and a bottom surface 20 and a receiving aperture 22 extends through the top surface 18 and the bottom surface 20. The receiving aperture 22 is positioned on a back side 24 of the canopy 16 such that the receiving aperture 22 is visible to a caregiver pushing the infant transport 12. The receiving aperture 22 may be a factory element of the canopy 16 or the receiving aperture 22 may be cut into existing canopies.

A window 26 is provided and the window 26 is attached to the infant transport 12. The window 26 is positioned on the canopy 16 and covers the receiving aperture 22. Additionally, the window 26 may be a factory element of the canopy 16 or the window 26 may be an aftermarket add-on component. The window 26 comprises a first frame 28 that includes a pair of first members 30 each extending between a pair of second members 32, and the first members 30 are spaced aligned with respective ends of the second members 32 other such that the first frame 28 has a rectangular shape. Each of the first 30 and second members 32 has an inwardly facing surface 34. The first frame 28 is positioned on the top surface 18 of the canopy 16 having the first frame 28 surrounding the receiving aperture 22 in the canopy 16. The first frame 28 has a plurality of first apertures 36 extending therethrough and each of the first apertures 36 is aligned with a respective one of four corners of the first frame 28.

The window 26 further comprises a second frame 38 that includes a pair of primary members 40 each extending between a pair of secondary members 42. The primary members 40 are aligned with respective ends of the secondary members 42 such that the second frame 38 has a rectangular shape. The second frame 38 has a plurality of second apertures 44 extending therethrough and each of the second apertures 44 is aligned with a respective one of four corners of the second frame 38. The second frame 38 is positioned on the bottom surface 20 of the canopy 16 having the second frame 38 surrounding the receiving aperture 22 in the canopy 16. Moreover, each of the second apertures 44 is aligned with a respective one of the first apertures 36 in the first frame 28 when each of the first frame 28 and the second frame 38 are positioned on the canopy 16.

A pane 46 is attached to the first frame 28 and the pane 46 is comprised of a translucent material, such as Plexiglas or the like. The pane 46 has an outer edge 48 and the outer edge 48 is coextensive with and engages the inwardly facing surface 34 of each of the first 30 and second members 32 of the first frame 28. Thus, the pane 46 covers the receiving aperture 22 when the first frame 28 is positioned on the canopy 16. A plurality of fasteners 50 is provided and each of the fasteners 50 is extended through a respective one of the first 42 and second apertures 44 in the first 28 and second 38 frames. In this way the first frame 28 is coupled to the second frame 38 thereby retaining each of the first 28 and second 38 frames on the canopy 16. Each of the fasteners 50 may be screws or other type of releasable fastener.

A cover 52 is attached to the window 26 and the cover 52 is removably positioned over and covers the window 26. The cover 52 is comprised of an opaque material to inhibit light from flowing through the window 26 and into the infant transport 12. The cover 52 comprises a storing roller 54 that is rotatably mounted to a respective one of the first members 30 of the first frame 28. The storing roller 54 is rotatable about a longitudinal axis in a first direction and a second direction. Additionally, the storing roller 54 is oriented to be collinear with the respective first member 30. A pair of storing brackets 56 is each coupled to the storing roller 54. Each of the storing brackets 56 has a fastener extended therethrough and engaging the first frame 28 to retain the storing roller 54 on the first frame 28. The storing roller 56 includes a torsion spring 57 that is positioned in the storing roller 56 for biasing the storing roller 56 to rotate in the second direction.

A panel 58 is attached to the storing roller 54 and extends outwardly therefrom and the panel 58 has a distal edge 60 with respect to the storing roller 54 and a first surface 61. The panel 58 is wound onto the storing roller 54 when the storing roller 54 rotates in the first direction. The panel 58 extends across the pane 46 when distal edge 60 is urged away from the storing roller 54. Thus, such that the panel 58 inhibits the light from flowing through the receiving aperture 22 and into the infant transport 12.

An extracting roller 62 is rotatably mounted to an opposite one of the first members 30 of the first frame 28 with respect to the storing roller 54. The extracting roller 62 rotates in a deploying direction or in a storing direction. The extracting roller 62 comprises a shaft 64 has a first end 66 and a second end 68, and a bearing 70 is positioned around the shaft 64 such that the bearing 70 rotates around the shaft 64. A tube 72 is included and the bearing 70 is positioned within the tube 72 such that the tube 72 is rotatable about the shaft 64.

The tube 72 has an outside surface 74 and a pair of cylinders 76 is each of the cylinders 76 is rotatably positioned around the outside surface 74 of the tube 72. The cylinders 76 are spaced apart from each other on the tube 72. A plurality of first pulleys 78 is each rotatably coupled to the first frame 28. A plurality of second pulleys 80 is each rotatably coupled to the extracting roller 62. A plurality of rollers 82 is provided and each of the rollers 82 is attached to the first surface 62 of the panel 58.

A cable 84 extends around each of the first pulleys 78, the second pulleys 80, the rollers 82 and the cylinders 76. The cable 84 is attached to the distal edge 60 of the panel 58 and the cable 84 is in mechanical communication with the storing roller 54. The cable 84 draws the panel 58 toward the extracting roller 62 when the storing roller 54 is biased to rotate in the second direction. A pair of extracting brackets 86 is each coupled to a respective one of the first 66 and second 68 ends of the shaft 64. Each of the extracting brackets 86 has fasteners extended therethrough and engages the first frame 28 to retain the extracting roller 62 on the first frame 28.

Figure 1:
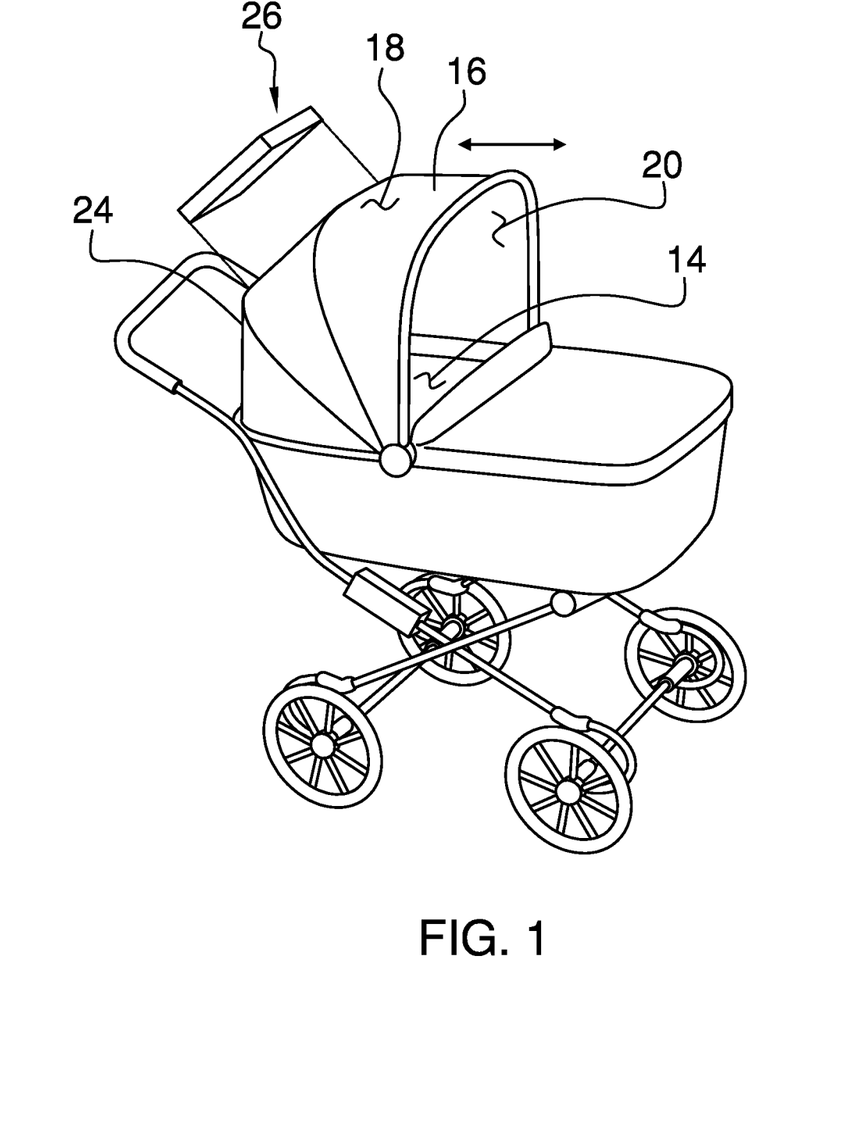
FIG. 1 is a perspective view of an insertable window assembly according to an embodiment of the disclosure.
Figure 2:
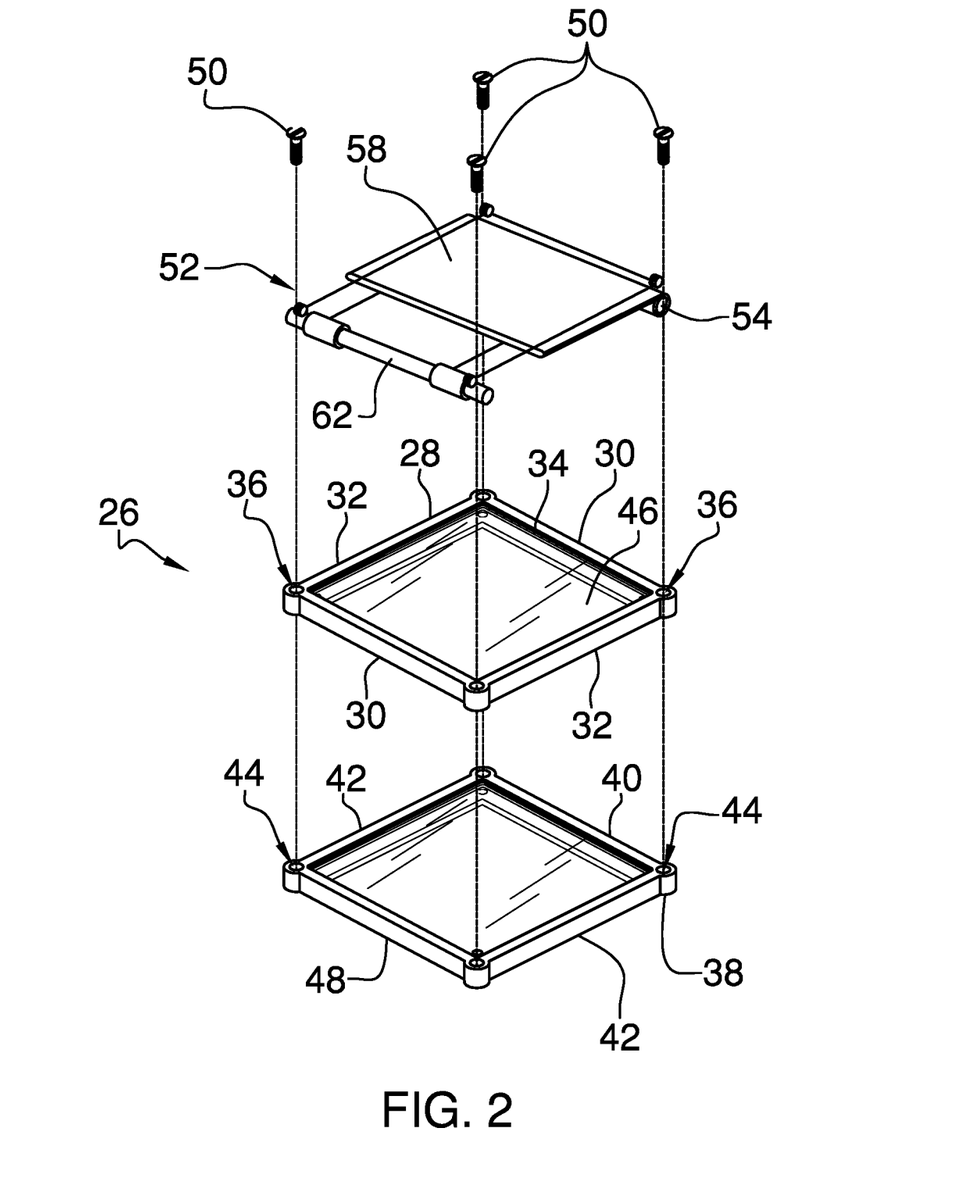
FIG. 2 is an exploded perspective view of window and a cover of an embodiment of the disclosure.
Figure 2A:
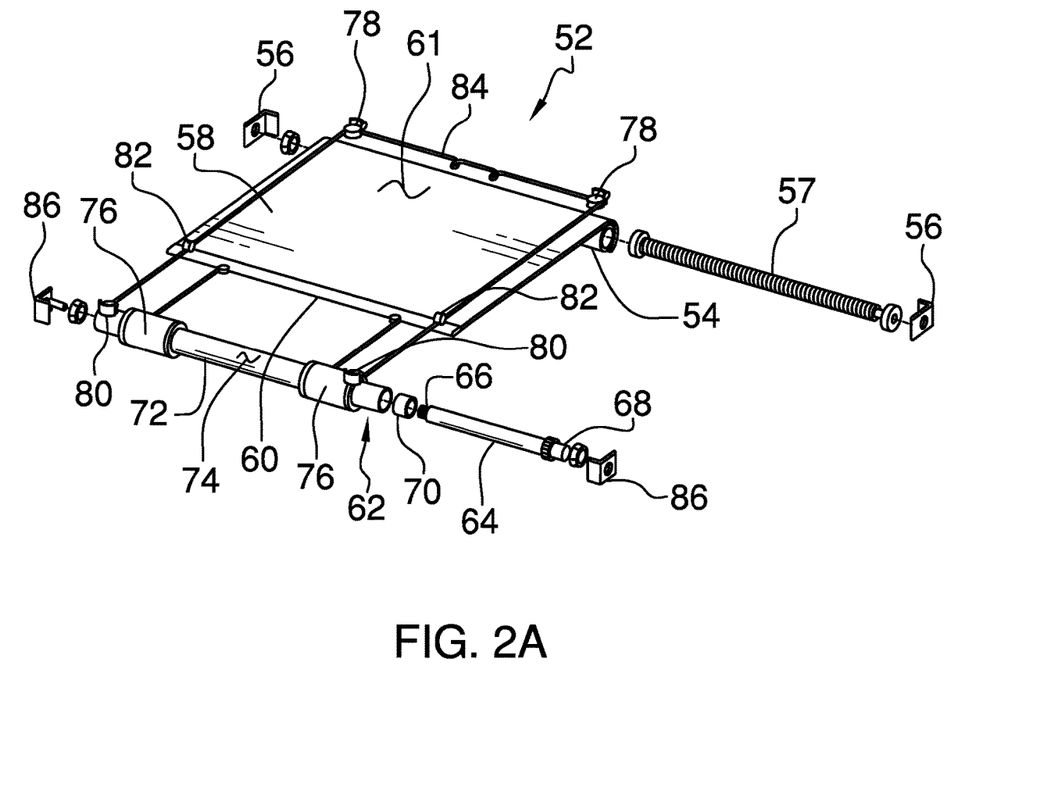
FIG. 2A is an exploded perspective view of a cover shown in FIG. 2.
Figure 3:
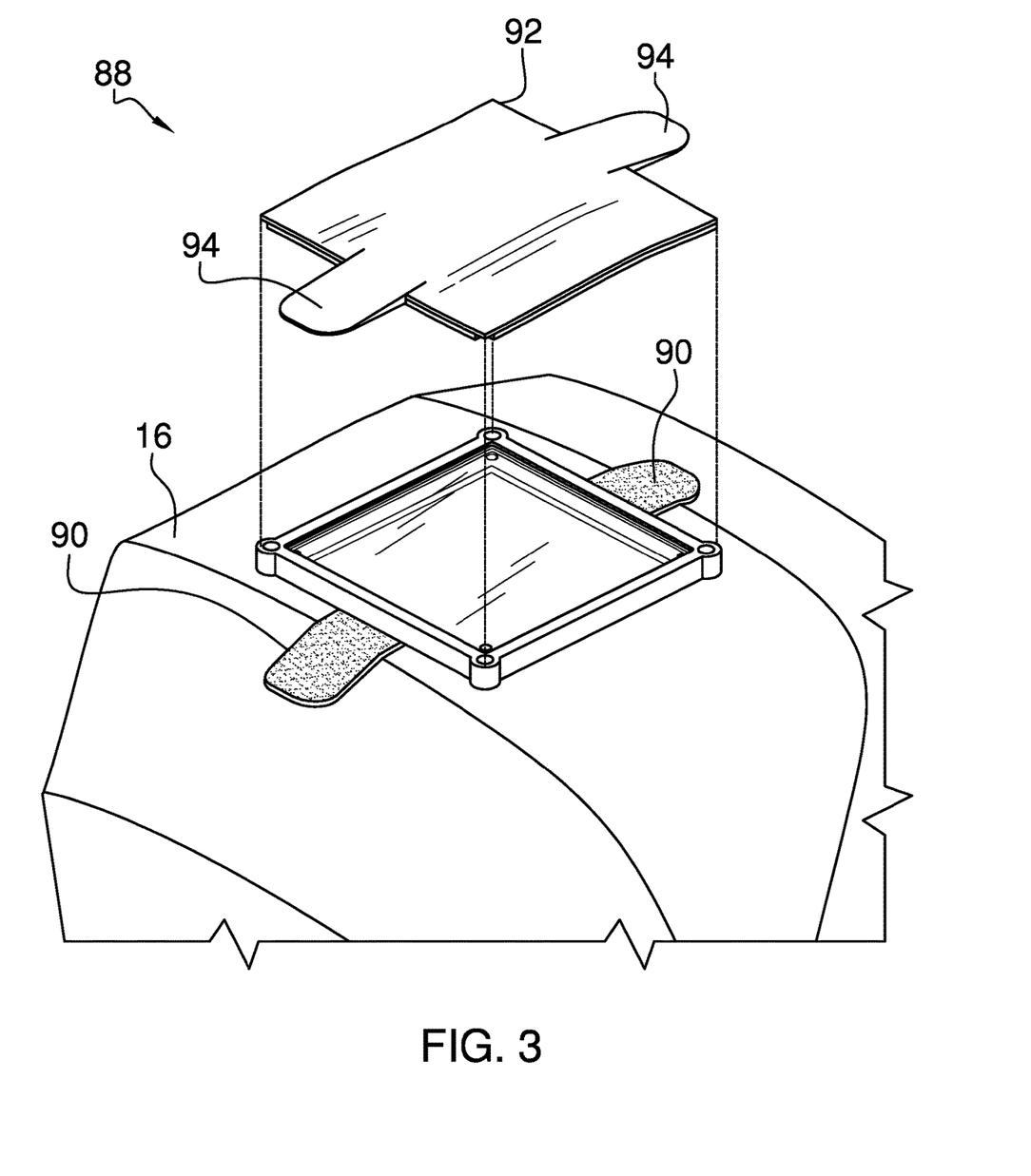
FIG. 3 is an exploded perspective view of an alternative embodiment of the disclosure.
Figure 4:
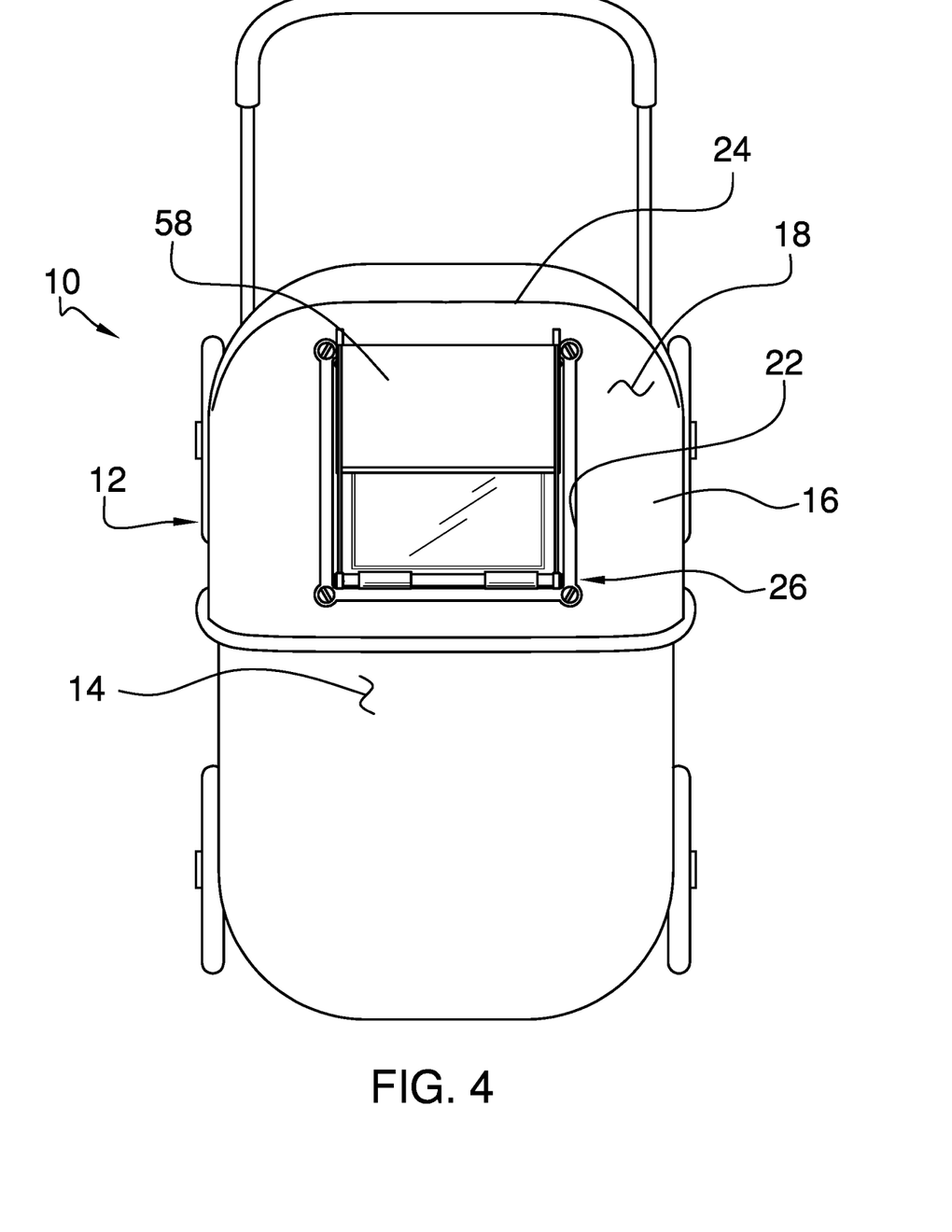
FIG. 4 is a top view of an embodiment of the disclosure.
Figure 5:
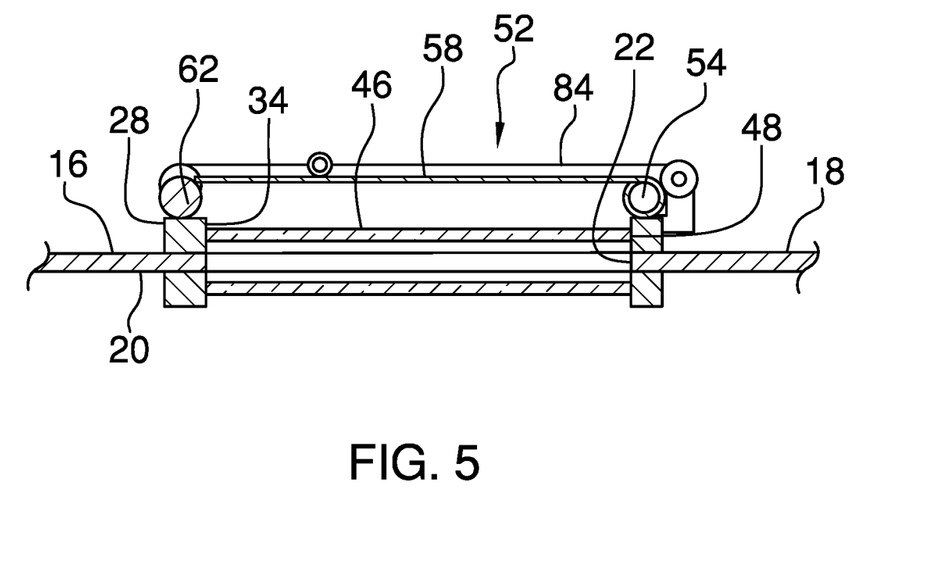
FIG. 5 is a cross sectional view taken along line 5-5 of FIG. 4 of an embodiment of the disclosure.

In an alternative embodiment 88 as shown in FIG. 3, a pair of first mating members 90 may be coupled to and extend laterally away from a respective one of the first members 30 of the first frame 28. A shield 92 may be provided and a pair of second mating members 94 may each be coupled to and extend laterally away from opposite sides of the first frame 28. The shield 92 is positionable over the window 26 having the second mating members 94 releasably engaging a respective one of the first mating members 60 to retain the shield 92 on the window.

In use, each of the first frame 28 and the second frame 38 are coupled to the canopy 16 to surround the receiving aperture 22 and thusly covering the receiving aperture 22 with the pane 46. In this way the caregiver can see the infant through the pane 46 when the caregiver is pushing the infant transport 12. Thus, the caregiver can immediately render first aid or the like to the infant when the infant experiences a medical crisis in the infant transport 12. The extracting roller 62 is manipulated to rotate in the deployment direction to draw the panel 58 across the pane 46. In this way the panel 58 inhibits light from passing through the pane 46 and thusly shades the infant in the infant transport 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insertable window assembly configured to be positioned on a stroller canopy, said assembly comprising:

an infant transport having a resting surface, said resting surface being configured to receive an infant thereon, said infant transport including a canopy at least partially covering said resting surface, said canopy having a top surface and a bottom surface, said canopy having a receiving aperture extending through said top surface and said bottom surface;

a window being attached to said infant transport, said window being positioned on said canopy and covering said receiving aperture wherein said window is configured to facilitate a caregiver to see the infant in said infant transport;
a cover being attached to said window, said cover being removably positioned over and covering said window, said cover being comprised of an opaque material wherein said cover is configured to inhibit light from flowing through said window into said infant transport; and
wherein said window comprises a first frame comprising a pair of first members each extending between a pair of second members, said first members being spaced apart from each other such that said first frame has a rectangular shape, each of said first and second members having an inwardly facing surface, said first frame being positioned on said top surface of said canopy having said first frame surrounding said receiving aperture in said canopy.

2. The assembly according to claim 1, wherein said first frame has a plurality of first apertures extending therethrough, each of said first apertures being aligned with a respective one of four corners of said first frame.

3. The assembly according to claim 2, wherein said window comprises a second frame comprising a pair of primary members each extending between a pair of secondary members, said primary members being spaced apart from each other such that said second frame has a rectangular shape, said second frame being positioned on said bottom surface of said canopy having said second frame surrounding said receiving aperture in said canopy.

4. The assembly according to claim 3, wherein said second frame has a plurality of second apertures extending therethrough, each of said second apertures being aligned with a respective one of four corners of said second frame, each of said second apertures being aligned with a respective one of said first apertures in said first frame when each of said first frame and said second frame are positioned on said canopy.

5. The assembly according to claim 1, further comprising a pane being attached to said first frame, said pane having an outer edge, said outer edge being coextensive with and engaging said inwardly facing surface of each of said first and second members of said first frame such that said pane covers said receiving aperture when said first frame is positioned on said canopy, said pane being comprised of a translucent material.

6. The assembly according to claim 4, further comprising a plurality of fasteners, each of said fasteners being extended through a respective one of said first and second apertures in said first and second frames to couple said first frame to said second frame thereby retaining each of said first and second frames on said canopy.

7. The assembly according to claim 5, wherein said cover comprises:
a storing roller being rotatably mounted to a respective one of said first members of said first frame, said storing roller rotating about a longitudinal axis, said storing roller being rotatable in a first direction and a second direction; and
a pair of storing brackets, each of said storing brackets being coupled to said storing roller, each of said storing brackets having a fastener extended therethrough and engaging said first frame to retain said storing roller on said first frame.

8. The assembly according to claim 7, further comprising a panel being attached to said storing roller and extending outwardly therefrom, said panel having a distal edge with respect to said storing roller and a first surface, panel being wound onto said storing roller when said storing roller rotates in said first direction, said panel extending across said pane when distal edge is urged away from said storing roller such that said panel inhibits said light from flowing through said viewing aperture and into said infant transport.

9. The assembly according to claim 8, wherein said cover includes an extracting roller being rotatably mounted to an opposite one of said first members of said first frame with respect to said storing roller, said extracting roller rotating in a deploying direction or in a storing direction.

10. The assembly according to claim 9, wherein said extracting roller comprises:
a shaft having a first end and a second end;
a bearing being positioned around said shaft such that said bearing rotates around said shaft;
a tube having said bearing being positioned therein such that said tube is rotatable about said shaft, said tube having an outside surface; and
a pair of cylinders, each of said cylinders being rotatably positioned around said tube, said cylinders being spaced apart from each other on said tube.

11. The assembly according to claim 10, further comprising:
a plurality of first pulleys, each of said pulleys being rotatably coupled to said first frame;
a plurality of second pulleys, each of said second pulleys being rotatably coupled to said extracting roller; and
a plurality of rollers, each of said rollers being attached to said first surface of said panel.

12. The assembly according to claim 11, further comprising a cable extending around each of said first pulleys, said second pulleys, said rollers and said cylinders, said cable being attached to said distal edge of said panel, said cable being in mechanical communication with said storing roller, said cable drawing said panel toward said extracting roller when said storing roller is biased to rotate in said second direction.

13. The assembly according to claim 10, further comprising a pair of extracting brackets, each of said extracting brackets being coupled to a respective one of said first and second ends of said shaft, each of said extracting brackets having fasteners extended therethrough and engaging said first frame to retain said extracting roller on said first frame.

14. An insertable window assembly configured to be positioned on a stroller canopy, said assembly comprising:
an infant transport having a resting surface, said resting surface being configured to receive an infant thereon, said infant transport including a canopy at least partially covering said resting surface, said canopy having a top surface and a bottom surface, said canopy having a receiving aperture extending through said top surface and said bottom surface;
a window being attached to said infant transport, said window being positioned on said canopy and covering said receiving aperture wherein said window is configured to facilitate a caregiver to see the infant in said infant transport, said window comprising:
a first frame comprising a pair of first members each extending between a pair of second members, said first members being spaced apart from each other such that said first frame has a rectangular shape, each of said first and second members having an inwardly facing surface, said first frame having a plurality of first apertures extending therethrough, each of said first apertures being aligned with a respective one of four corners of said first frame, said first frame being positioned on said top surface of said canopy having said first frame surrounding said receiving aperture in said canopy;

a second frame comprising a pair of primary members each extending between a pair of secondary members, said primary members being spaced apart from each other such that said second frame has a rectangular shape, said second frame having a plurality of second apertures extending therethrough, each of said second apertures being aligned with a respective one of four corners of said second frame, said second frame being positioned on said bottom surface of said canopy having said second frame surrounding said receiving aperture in said canopy, each of said second apertures being aligned with a respective one of said first apertures in said first frame when each of said first frame and said second frame are positioned on said canopy;

a pane being attached to said first frame, said pane having an outer edge, said outer edge being coextensive with and engaging said inwardly facing surface of each of said first and second members of said first frame such that said pane covers said receiving aperture when said first frame is positioned on said canopy, said pane being comprised of a translucent material;

a plurality of fasteners, each of said fasteners being extended through a respective one of said first and second apertures in said first and second frames to couple said first frame to said second frame thereby retaining each of said first and second frames on said canopy; and a cover being attached to said window, said cover being removably positioned over and covering said window, said cover being comprised of an opaque material wherein said cover is configured to inhibit light from flowing through said window into said infant transport, said cover comprising:

a storing roller being rotatably mounted to a respective one of said first members of said first frame, said storing roller rotating about a longitudinal axis, said storing roller being rotatable in a first direction and a second direction;

a pair of storing brackets, each of said storing brackets being coupled to said storing roller, each of said storing brackets having a fastener extended therethrough and engaging said first frame to retain said storing roller on said first frame;

a panel being attached to said storing roller and extending outwardly therefrom, said panel having a distal edge with respect to said storing roller and a first surface, panel being wound onto said storing roller when said storing roller rotates in said first direction, said panel extending across said pane when distal edge is urged away from said storing roller such that said panel inhibits said light from flowing through said viewing aperture and into said infant transport;

an extracting roller being rotatably mounted to an opposite one of said first members of said first frame with respect to said storing roller, said extracting roller rotating in a deploying direction or in a storing direction, said extracting roller comprising:

a shaft having a first end and a second end;

a bearing being positioned around said shaft such that said bearing rotates around said shaft;

a tube having said bearing being positioned therein such that said tube is rotatable about said shaft, said tube having an outside surface;

a pair of cylinders, each of said cylinders being rotatably positioned around said tube, said cylinders being spaced apart from each other on said tube;

a plurality of first pulleys, each of said pulleys being rotatably coupled to said first frame;

a plurality of second pulleys, each of said second pulleys being rotatably coupled to said extracting roller;

a plurality of rollers, each of said rollers being attached to said first surface of said panel;

a cable extending around each of said first pulleys, said second pulleys, said rollers and said cylinders, said cable being attached to said distal edge of said panel, said cable being in mechanical communication with said storing roller, said cable drawing said panel toward said extracting roller when said storing roller is biased to rotate in said second direction; and a pair of extracting brackets, each of said extracting brackets being coupled to a respective one of said first and second ends of said shaft, each of said extracting brackets having fasteners extended therethrough and engaging said first frame to retain said extracting roller on said first frame.

* * * * *